US 9,919,549 B2

(12) United States Patent
Zhou et al.

(10) Patent No.: US 9,919,549 B2
(45) Date of Patent: Mar. 20, 2018

(54) CALCULABLE THREE-DIMENSIONAL COLOR PRINTING METHOD

(71) Applicant: ZHEJIANG UNIVERSITY, Hangzhou (CN)

(72) Inventors: Kun Zhou, Hangzhou (CN); Yizhong Zhang, Hangzhou (CN); Chunji Yin, Hangzhou (CN); Changxi Zheng, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 15/604,625

(22) Filed: May 24, 2017

(65) Prior Publication Data

US 2017/0320346 A1    Nov. 9, 2017

Related U.S. Application Data

(63) Continuation of application No. PCT/CN2015/072119, filed on Feb. 2, 2015.

(51) Int. Cl.
*B41M 1/40* (2006.01)
*B41M 5/00* (2006.01)
(Continued)

(52) U.S. Cl.
CPC ............ *B41M 1/40* (2013.01); *B41M 5/0088* (2013.01); *G06T 7/50* (2017.01); *G06T 17/00* (2013.01);
(Continued)

(58) Field of Classification Search
CPC ... B41M 1/40; B41M 5/0088; H04N 1/00827; H04N 2201/0084; G06T 7/50;
(Continued)

(56) References Cited

U.S. PATENT DOCUMENTS 6,081,273 A     6/2000  Weng et al. ................... 345/425
8,850,973 B2 * 10/2014 Ikeda .................... B44C 1/1752
                                                                101/34
(Continued)

FOREIGN PATENT DOCUMENTS

CN     103818132 A    5/2014
CN     103862974 A    6/2014
(Continued)

OTHER PUBLICATIONS

WO2016123740 Search Report English Translation, dated Aug. 8, 2017.*

(Continued)

*Primary Examiner* — David Banh
(74) *Attorney, Agent, or Firm* — J.C. Patents (57) ABSTRACT

A calculable 3D color printing method is used for generating, on a 3D object surface, a user-specified color texture pattern, including: performing modeling and simulated calculation with respect to a motion and a deformation of a PVA film in a traditional water transfer printing process to obtain a mapping function between each of pixels on the PVA film and points on an object surface; and calculating, by using the mapping function, a texture pattern to print on the PVA film. This disclosure further includes a set of mechanical devices and a 3D vision system for realizing precise and controllable water transfer printing which precisely prints a user-specified texture pattern onto an object surface. This disclosure further includes a multiple water transfer printing method, including: partitioning a complex object surface into a plurality of regions, and separately coloring each region, until eventually completing coloring of the entire object surface.

8 Claims, 5 Drawing Sheets

(51) Int. Cl.
  *H04N 1/00* (2006.01)
  *G06T 7/50* (2017.01)
  *G06T 17/00* (2006.01)
  *G06T 19/20* (2011.01)

(52) U.S. Cl.
  CPC ......... *G06T 19/20* (2013.01); *H04N 1/00827* (2013.01); *G06T 2219/2004* (2013.01); *G06T 2219/2012* (2013.01); *H04N 2201/0084* (2013.01)

(58) Field of Classification Search
  CPC . G06T 17/00; G06T 19/20; G06T 2219/2004; G06T 2219/2012
  See application file for complete search history.

(56) References Cited

U.S. PATENT DOCUMENTS

| | | | |
|---|---|---|---|
| 8,858,053 B1 | 10/2014 | Patrick et al. | 362/612 |
| 9,090,118 B2* | 7/2015 | Ikeda | B44C 1/16 |
| 2007/0042163 A1* | 2/2007 | Ariga | B44C 1/175 428/195.1 |
| 2013/0291746 A1* | 11/2013 | Ikeda | B44C 1/175 101/368 |
| 2016/0198577 A1* | 7/2016 | Janssen | H05K 3/007 427/99.5 |

FOREIGN PATENT DOCUMENTS

| | | |
|---|---|---|
| CN | 104149510 A | 11/2014 |
| CN | 104626590 A | 5/2015 |

OTHER PUBLICATIONS

Ondrej Stava et al., "Stress Relief: Improving Structural Strength of 3D Printable Objects" ACM Transactions on Graphics (TOG)—Proceedings of ACM SIGGRAPH 2012; vol. 31, Issue 4, Jul. 2012; Article No. 48.
Moritz Bacher et al., "Fabricating Articulated Characters from Skinned Meshes" ACM Transactions on Graphics (TOG)—Proceedings of ACM SIGGRAPH 2012; vol. 31, Issue 4, Jul. 2012; Article No. 47.
Jacques Cali et al., "3D-Printing of Non-Assembly, Articulated Models" ACM Transactions on Graphics (TOG)—Proceedings of ACM SIGGRAPH Asia 2012; vol. 31, Issue 6, Nov. 2012; Article No. 130.
Romain Prevost et al., "Make It Stand: Balancing Shapes for 3D Fabrication" ACM Transactions on Graphics (TOG)—SIGGRAPH 2013 Conference Proceedings; vol. 32, Issue 4, Jul. 2013; Article No. 81.
Stelian Coros et al., "Computational Design of Mechanical Characters" ACM Transactions on Graphics (TOG)—SIGGRAPH 2013 Conference Proceedings; vol. 32, Issue 4, Jul. 2013; Article No. 83.
Duygu Ceylan et al., "Designing and Fabricating Mechanical Automata from Mocap Sequences" ACM Transactions on Graphics (TOG)—Proceedings of ACM SIGGRAPH Asia 2013 ; vol. 32, Issue 6, Nov. 2013; Article No. 186.
Bernhard Thomaszewski et al., "Computational Design of Linkage-Based Characters" ACM Transactions on Graphics (TOG)—Proceedings of ACM SIGGRAPH 2014; vol. 33, Issue 4, Jul. 2014; Article No. 64.
Bernd Bickel et al., "Capture and Modeling of Non-Linear Heterogeneous Soft Tissue" ACM Transactions on Graphics (TOG)—Proceedings of ACM SIGGRAPH 2009; vol. 28, Issue 3, Aug. 2009; Article No. 89.
Melina Skouras et al., "Computational Design of Actuated Deformable Characters" ACM Transactions on Graphics (TOG)—SIGGRAPH 2013 Conference Proceedings; vol. 32 Issue 4, Jul. 2013; Article No. 82.
Tim Weyrich et al., "Fabricating Microgeometry for Custom Sufrface Reflectance" ACM Transactions on Graphics (TOG)—Proceedings of ACM SIGGRAPH 2009; vol. 28, Issue 3, Aug. 2009; Article No. 32.
Wojciech Matusik et al., "Printing Spatially-Varying Reflectance" ACM Transactions on Graphics (TOG)—Proceedings of ACM SIGGRAPH Asia 2009 ; vol. 28, Issue 5, Dec. 2009; Article No. 128.
Yanxiang Lan et al., "Bi-Scale Appearance Fabrication" ACM Transactions on Graphics (TOG)—SIGGRAPH 2013 Conference Proceedings; vol. 32, Issue 4, Jul. 2013; Article No. 145.
Yue Dong et al., "Fabricating Spatially-Varying Subsurface Scattering" ACM Transactions on Graphics (TOG)—Proceedings of ACM SIGGRAPH 2010; vol. 29, Issue 4, Jul. 2010; Article No. 62.
Milos Hasan et al., "Physical Reproduction of Materials with Specified Subsurface Scattering" ACM Transactions on Graphics (TOG)—Proceedings of ACM SIGGRAPH 2010; vol. 29, Issue 4, Jul. 2010; Article No. 61.
Tom Malzbender et al., "Printing Reflectance Functions" ACM Transactions on Graphics (TOG); vol. 31, Issue 3, May 2012; Article No. 20.
N. M. Ribe, "A general theory for the dynamics of thin viscous sheets" Journal of Fluid Mechanics; vol. 457, Issue 01; pp. 255-283.
Christopher Batty et al., "Discrete Viscous Sheets" ACM Transactions on Graphics (TOG)—Proceedings of ACM SIGGRAPH 2012; vol. 31, Issue 4, Jul. 2012; Article No. 113.
Frank M. White, "Viscous Fluid Flow" Publisher: McGraw-Hill Mechanical Engineering, 2005; ISBN 10: 007124493X.
Pedro V. Sander et al., "Texture Mapping Progressive Meshes" Proceedings of the 28th annual conference on Computer graphics and interactive techniques; pp. 409-416.
Bruno Levy et al., "Least Squares Conformal Maps for Automatic Texture Atlas Generation" ACM Transactions on Graphics (TOG)—Proceedings of ACM SIGGRAPH 2002; vol. 21, Issue 3, Jul. 2002; pp. 362-371.
Mathieu Desbrun et al., "Intrinsic Parameterizations of Surface Meshes" The Eurographics Association; vol. 21, Issue 3; Sep. 2002; pp. 209-218.
Vladislav Kraevoy et al., "Matchmaker: Constructing Constrained Texture Maps" ACM Transactions on Graphics (TOG)—Proceedings of ACM SIGGRAPH 2003; vol. 22, Issue 3, Jul. 2003; pp. 326-333.
Kun Zhou et al., "TextureMontage: Seamless Texturing of Arbitrary Surfaces From Multiple Images" ACM Transactions on Graphics (TOG)—Proceedings of ACM SIGGRAPH 2005; vol. 24, Issue 3, Jul. 2005; pp. 1148-1155.
International Search Report of corresponding International PCT Application No. PCT/CN2015/072119, dated Jul. 22, 2015.

\* cited by examiner

CALCULABLE THREE-DIMENSIONAL COLOR PRINTING METHOD

CROSS-REFERENCE TO RELATED APPLICATIONS

This application is a continuation of International Application No. PCT/CN2015/072119, filed on Feb. 2, 2015, the disclosure of which is hereby incorporated by reference in its entirety.

TECHNICAL FIELD

This disclosure relates to 3D printing and 3D object surface coloring technologies, and particularly, to a calculable 3D color printing method.

BACKGROUND

Research background related to this disclosure is outlined in the following:

1. 3D Printing and Appearance Fabrication

Among numerous 3D printing technologies, many methods are included for fabricating models having desired physical attributes, such as for obtaining desired stress distribution (Stava, O., Vanek, J., Benes, B., Carr, N., Mech, R. 2012. Stress relief: Improving structural strength of 3d printable objects. ACM Trans. Graph. 31, 4, 48.), articulated models (Bacher, M., Bickel, B., James, D. L., Pfister, H. 2012. Fabricating articulated characters from skinned meshes. ACM Trans. Graph. 31, 4, 47; Cali, J., Calian, D. A., Amati, C., Kleinberger, R., Steed, A., Kautz, J., Weyrich, T. 2012. 3d-printing of non-assembly, articulated models. ACM Trans. Graph. 31, 6, 130.), model balance (Prevost, R., Whiting, E., Lefebver, S., Sorkine-Hornung, O. 2013. Make it stand: balancing shapes for 3d fabrication. ACM Trans. Graph. 32, 4, 81.), movable models (Coros, S., Thomaszewski, B., Noris, G., Sueda, S., Forberg, M., Sumner, R. W., Matusik, W., Bickel, B. 2013. Computational design of mechanical characters. ACM Trans. Graph. 793 32; Ceylan, D., Li, W., Mitra, N. J., Agrawala, M., Pauly, M. 2013. Designing and fabricating mechanical automata from mocap sequences. ACM Trans. Graph. 32, 6, 186; Thomaszewski, B., Coros, S., Gauge, D., Megaro, V., Grinspun, E., Gross, M. 2014. Computational design of linkage based characters. ACM Trans. Graph. 33, 4 (July), 64:1-64:9.), and deformable objects, etc. (Bickel, B., Bacher, M., Otaduy, M. A., Matusik, W., Pfister, H., Gross, M. 2009. Capture and modeling of non-linear heterogeneous soft tissue. ACM Trans. Graph. 28, 3 (July); Skouras, M., Thomaszewski, B., Coros, S., Bickel, B., Gross, M. 2013. Computational design of actuated deformable characters. ACM Trans. Graph. 32, 4, 82.). Yet, none of these methods considers surface color of the object.

There are other methods for creating desired appearance attributes, such as surface reflectance (Weyrich, T., Perrs, P., Matusik, W., Rusinkiewicz, S. 2009. Fabricating microgeometry for custom surface reflectance. ACM Trans. Graph. 28, 3, 32; Matusik, W., Ajdin, B., Gu, J., Lawrence, J., Lensch, H. P. A., Pellacini, F., Rusinkiewicz, S. 2009. Printing spatially varying reflectance. ACM Trans. Graph. 28, 5, 128; Lan, Y., Dong, Y., Pellacini, F., Tong, X. 2013. Bi-scale appearance fabrication. ACM Trans. Graph. 32, 4, 145.), subsurface scattering (Dong, Y., Wang, J., Pellacini, F., Tong, X., Guo, B. 2010. Fabricating spatially-varying subsurface scattering. ACM Trans. Graph. 29, 3, 62; Hasan, M., Fuchs, M., Matusik, W., Pfister, H., Rusinkiewicz, S. 2010. Physical reproduction of materials with specified subsurface scattering. ACM Trans. Graph. 29, 3.), and for realizing desired reflectance functions (Malzbender, T., Samadani, R., Scher, S., Crume, A., Dunn, D., Davis, J. 2012. Printing reflectance functions. ACM Trans. Graph. 31, 3, 20.). These methods produces desired appearance by modifying microscopic geometric details of the materials, and are limited to certain types of materials. Instead, the method of this disclosure is intended for accurately coloring 3D object surface according to user-specified texture without modifying the object itself, and is applicable for a wider range of material types.

2. 3D Object Surface Coloring Technologies

Existing technologies for coloring 3D object surface have their own merits and limitations. 3D color printers offer high quality coloring for curved surface, but supporting only limited selection of colors and materials, and incurring very high costs. Vinyl decals can print patterns of arbitrary colors onto object surfaces, but are only applicable to simple geometries. Electrical plating and enameling require sophisticated devices, and are only applicable to limited types of materials, such as metal and ceramics, incurring relatively high costs. Water transfer printing supports both complex textures and various material types, including metal, plastic, and woods, and has been extensively used to decorate furniture, electronic products, and automotive accessories. Yet, there is no method to-date for simulating the water transfer printing process. Thus, the traditional water transfer printing does not support accurately controllable printing process. These limitations have confined existing water transfer printing process to reproducing repeated patterns that do not require very accurate positioning.

3. Viscous Sheet Simulation

The presently disclosed calculable water transfer printing technology performs the simulated calculation by approximating a PVA film with a thin viscous sheet. The thin viscous sheet dynamics model is built on the foundation of continuum mechanics (Ribe, N. 2002. A general theory for the dynamics of thin viscous sheets. Journal of Fluid Mechanics 457, 255-283; Batty, C., Uribe, A., Audoly, B., Grinspun, E. 2012. Discrete viscous sheets. ACM Trans. Graph. 31, 4 (July).). Other than the thin viscous sheet kinematic model, the simulated calculation of this disclosure further involves Stokes flow (White, F. M., Corfield, I. 1991. Viscous fluid flow, vol. 3. McGraw-Hill New York.) as an approximation of the Navier-Stokes equation in the regime of low Reynolds numbers. In this disclosure, these models have been simplified to a two-dimension process in order to offer fast and accurate simulation for the dynamics of the thin sheet.

4. Texture Mapping

Texture mapping is widely used in coloring 3D models in the virtual regime. Numerous algorithms may be leveraged to calculate a mapping relationship between a 3D model surface and a planar pattern with minimum angle and/or area distortion (Sander, P. V., Snyder, J., Gortler, S. J., Hoppe, H. 2001. Texture mapping progressive meshes. In Proceedings of SIGGRAPH'01, ACM, New York, N.Y., USA, 409-416; Levy, B., Petitjean, S., Ray, N., Maillot, J. 2002. Least squares conformal maps for automatic texture atlas generation. ACM Trans. Graph. 21, 3, 362-371; Desbrun, M., Meyer, M., Alliez, P. 2002. Intrinsic parameterizations of surface meshes. Comput. Graph. Forum 21.) while satisfying user-specified feature corresponding relationship (Kraevoy, V., Sheffer, A., Gotsman, C. 2003. Matchmaker: constructing constrained texture maps. ACM Trans. Graph. 22, 3, 326-3338; Zhou, K., Wang, X., Tong, Y., Desbrun, M., Guo, B., Shum, H.-Y. 2005. Texturemontage: Seamless texturing of arbitrary surfaces from multiple images. ACM Trans. Graph. 24, 3.). Unlike the texture mapping which colors virtual models, the presently disclosed method colors real-world 3D objects.

SUMMARY

An objective of the present disclosure lies in providing a calculable 3D color printing method targeting at disadvantages in existing technologies for coloring 3D object surfaces.

The objective of this disclosure is realized through the technical solutions as the following: a calculable 3D color printing method including the following steps:

(1) device initialization: fixing an 3D object at an end of a device capable of lifting and lowering at a constant speed; and calculating a position and an orientation of the object relative to a PVA film using a 3D vision system, namely obtaining a 3D model of the 3D object;

(2) virtual simulation: performing simulated calculation with respect to a motion of the PVA film while the 3D object is being lowered at a constant speed;

(3) calculating texture pattern on the PVA film: calculating a corresponding relationship between each pixel on the PVA film and an object surface point by the virtual simulation; and obtaining a texture pattern on the PVA film by assigning a color on the object surface point to the pixel on the PVA film;

(4) physical printing: printing the texture pattern obtained by the calculating at step (3) onto the PVA film; arranging the PVA film onto water surface at a fixed location; and performing water transfer printing and coloring; and (5) multiple printing: performing water transfer printing operations from varied angles for an object having complex surface geometry, wherein only a portion of the object surface is colored each time, until the entire object surface is colored.

Furthermore, the step (1) includes the following sub-steps:

(1.1) fixing the 3D object at a push rod of a linear motor, wherein the push rod is capable of moving up and/or moving down at a constant speed, a water basin is arranged beneath the motor for arranging the PVA film, and a fixing rod for fixing the PVA film and a marker for 3D positioning are arranged on the water basin;

(1.2) scanning the 3D object and markers for 3D positioning using a depth camera to obtain a point cloud; and (1.3) aligning a digital model of the 3D object and a digital model of the marker to the point cloud employing an ICP (iterative closest point) algorithm, so as to calculate the position and the orientation of the object relative to the PVA film, namely obtaining a 3D model of the 3D object.

Furthermore, the step (2) includes the following sub-steps:

(2.1) calculating a waterline of the 3D object according to the position of the 3D object; triangulating a region where the PVA film is presented to obtain a virtual PVA film; initializing a velocity of each vertex on the virtual PVA film to zero; and specifying a boundary condition for the simulated calculation according to a position of the waterline and a surface normal of the 3D model;

(2.2) solving a motion equation for the virtual PVA film using an implicit method; updating the velocity at each vertex on the virtual PVA film; and then updating a thickness at each vertex on the virtual PVA film;

(2.3) updating the position of the 3D model according to the speed at which the object is being lowered; updating the waterline of the 3D model; and re-triangulating the region where the PVA film is presented to obtain a new virtual PVA film; and interpolating the velocity and the thickness of each vertex on the virtual PVA film that have been updated at step (2.2); and updating the boundary condition for the simulated calculation; and (2.4) iterating through step (2.2) and step (2.3) until the 3D model is completely immersed in the water.

Furthermore, the calculating a boundary condition in step (2) includes the following sub-steps:

(a) setting a velocity at zero for each vertex on an outer boundary of the virtual PVA film; and (b) setting a velocity at $v_d n(\cos\theta-1)/\sin\theta$ for each vertex on an inner boundary of the virtual PVA film, where $v_d$ is the speed at which the object is being lowered, $\theta$ is an angle between a horizontal plane and a surface tangential direction of the 3D model at a point closest to a virtual PVA film vertex, and n is an unit vector along a horizontal projection of a surface normal direction of the 3D model at a point closest to a virtual PVA film vertex.

Furthermore, the step (3) includes the following sub-steps:

(3.1) recording, for each pixel point on the PVA film, a corresponding point where the pixel point is in contact with the 3D model surface; and (3.2) setting a color value of each pixel point on the PVA film according to a color value of the corresponding point on the 3D model surface, so as to eventually obtain a texture pattern to be printed onto the PVA film.

Furthermore, the step (4) includes the following sub-steps:

(4.1) printing the texture pattern obtained at step (3) onto the PVA film;

(4.2) placing the PVA film on a water basin, and fixing the PVA film in position with a fixing rod; and (4.3) spraying activator onto the PVA film; starting a linear motor to drive the 3D object down at a constant speed, until the texture pattern on the PVA film is attached onto a surface of the 3D object.

Furthermore, the step (5) includes the following sub-steps:

(5.1) mounting the object onto a device capable of lifting and lowering according to a plurality of printing directions specified by a user; and calculating, for each of the printing directions, a position and an orientation of the object relative to a PVA film according to step (2);

(5.2) performing simulated calculation, for each of the printing directions, with respect to a motion of the PVA film in a printing process; and calculating, for each vertex on the 3D model, a corresponding point on the PVA film and a local stretch measure at the vertex of the 3D model;

(5.3) selecting, for each vertex on the 3D model, a printing direction with the minimum local stretch measure as a primary direction for coloring the vertex, so as to partition the entire 3D model into several regions, where each region uses a different printing direction as the primary direction for coloring;

(5.4) constructing a transitional region on the 3D model where different printing direction regions intersect with one another; and calculating, for each vertex in the transitional region, a coloring weight for each of the printing directions; and (5.5) performing, for each of the printing directions, printing operations according to steps (1)-(4), where, when step (3) is being carried out, a texture pattern is calculated according to the equation as the following based on the coloring weight obtained at step (5.4):

$$\omega_{i,j}c_j+(1-\omega_{i,j})W$$

where $\omega_{i,j}$ is the coloring weight, i is a printing direction, j is an index of a vertex, W is white color, and $c_j$ is a color acquired by the vertex j directly from the object surface.

Furtherly, the calculating a local stretch measure in step (5.2) includes the following sub-steps:

(5.2.1) locating, for three vertices of each triangle on the 3D model, corresponding points on the virtual PVA film to obtain a corresponding planar triangle;

(5.2.2) calculating an affine transformation from each planar triangle to a corresponding spatial triangle, where a largest singular value of the affine transformation indicates the local stretch measure for the triangle on the 3D model; and (5.2.3) taking the local stretch measure of each vertex on the 3D model as a largest local stretch measure for neighboring triangles encircling the vertex.

An advantageous effect of this disclosure lies in that: this disclosure performs modeling and simulated calculation with respect to the motion and deformation of a PVA film in a traditional water transfer printing process to obtain a mapping function between each of pixels on the PVA film and an object surface point; and calculates, using the mapping function, a texture pattern to be printed onto the PVA film. This disclosure further includes a set of mechanical devices for realizing precise and controllable water transfer printing. The devices fix a PVA film on water surface, fix a 3D object at an end of a push rod, and drive the 3D object down at a constant speed using a linear motor. A 3D vision system is employed to calculate a position and an orientation of the 3D object relative to the PVA film, and a texture pattern to be printed on the PVA film is obtained using the aforementioned simulated calculation approach. Finally, water transfer printing operations are physically performed to precisely print a user-specified texture pattern onto the object surface. This disclosure further includes a multiple water transfer printing method, including: partitioning a complex object surface into a plurality of regions, and separately coloring each of the regions, until eventually completing coloring of the entire object surface. With simulated calculation with respect to the water transfer printing process, physical coloring for a complex 3D object surface according to a user-specified texture pattern is realized, can be applied to various material types, including metal, plastics, hard wood and ceramics, and at very low cost.

BRIEF DESCRIPTION OF DRAWINGS

FIG. 1A to FIG. 1E show a flowchart illustrating a printing method according to this disclosure, where FIG. 1A depicts a texture on the left and an object to be colored on the right, FIG. 1B depicts a virtual simulation, FIG. 1C depicts a calculated printing pattern, FIG. 1D depicts a physical color transferring, and FIG. 1E is an illustration of an output image;

FIG. 4A to FIG. 4C illustrate printing patterns calculated using a multiple printing method according to this disclosure, where FIG. 4A, FIG. 4B and FIG. 4C are diagrams comparing an original pattern—coloring weight diagram—final printed pattern for three directions, respectively;

FIG. 5A and FIG. 5B show a perspective view depicting an outcome of a single printing according to this disclosure, where FIG. 5A depicts a printed effect on a ceramic material, and FIG. 5B depicts a printed effect on a plastic material.

Included in the figures are: an object to be colored 1; a linear motor 2; a depth camera 3; a marker 4; a PVA film 5; a water basin 6; and a fixing rod 7.

DETAILED DESCRIPTION

Now the present disclosure will be fully described in connection with the figures and embodiments.

The essence of this disclosure lies in simulating a water transfer printing process to determine a texture pattern to be printed onto a PVA film, so that a user-specified texture pattern can be transferred onto an object surface through a water transfer printing process.

Figure 1A:
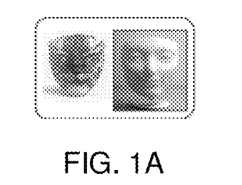
Figure 1B:
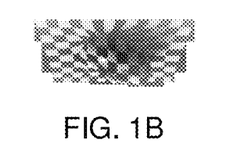
Figure 1C:
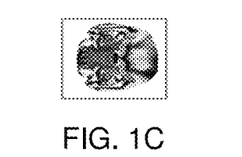
Figure 1D:
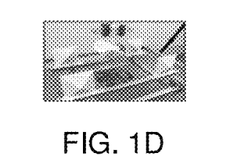
Figure 1E:
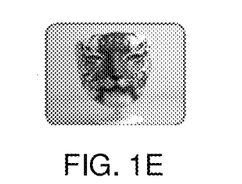
Figure 2:
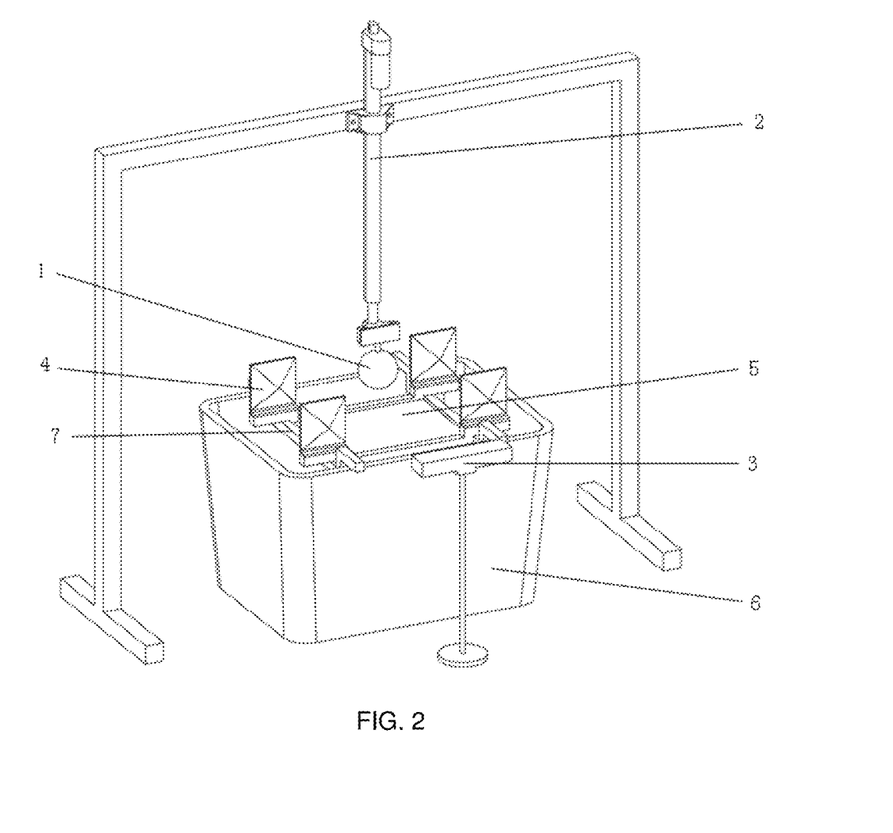
FIG. 2 is a schematic view illustrating mechanical devices according to this disclosure.

As depicted in FIG. 1A to FIG. 1E, the presently disclosed calculable 3D color printing method includes the following steps:

1. Device initialization: as depicted in FIG. 2, an object to be colored 1 is fixed to an end of a push rod of a linear motor 2. The entire device (especially 1 and 4) is scanned by a Microsoft Kinect depth camera 3 to obtain a point cloud thereof. Then, a model of the object and a model of a marker, which is part of the entire device, are align to the point cloud leveraging an ICP (iterative closest point) algorithm, thus obtaining a position and an orientation of the object relative to a PVA film 5.

The object is fixed on the push rod of the linear motor 2 by a clamp, and the push rod moves up and/or down at a constant speed. With a controller, the speed of motor 2 can be continuously adjusted within a range of 0 millimeter per second (mm/s)-10 mm/s. A water basin 6 is provided beneath the motor 2, in which the printed PVA film 5 is arranged on the water surface. Four fixing rods 7 stretch over the water surface and fix the PVA film 5 in position. Four pyramid shaped markers 4 are fixed on the fixing rods 7 at known locations in the device. The pattern is printed onto the PVA film 5 using a conventional ink jet printer.

2. Virtual simulation: perform simulated calculation with respect to a motion of the PVA film while the 3D object is being lowered at a constant speed.

The outer boundary of the PVA film is fixed. After the object is brought into contact with the water surface, part of the film is attached onto the surface of the object, with remaining portions of the film, which remains floating on the water, beginning to stretch, and the simulation process mainly targets at the film portions remaining on the water surface. The film is stretched according to two dimensional motions in that, the film is stretched towards the boundaries.

Figure 3:
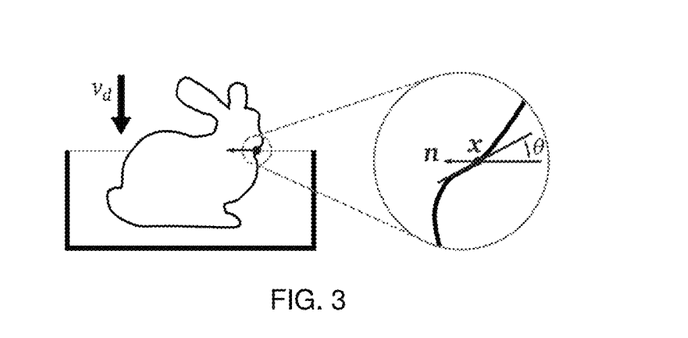
FIG. 3 is a schematic view illustrating a boundary condition specified for the simulated calculation according to this disclosure.

The velocity at the outer boundary of the film is zero. Along an inner boundary of the film where the object meets the film, the velocity of a contact point on the object follows the same direction as the water level projection of the normal direction at the contact point. As depicted in FIG. 3, assuming that $v_d$ is the speed at which the object is being lowered, θ is an angle between a horizontal plane and a surface tangential direction of the 3D model at a point closest to a virtual PVA film vertex, and n is an unit vector along a horizontal projection of a surface normal direction of the 3D model at a point closest to a virtual PVA film vertex, the velocity u(x) of a boundary point will be as the following:

$$u(x) = v_d n(\cos\theta - 1)/\sin\theta$$

After the boundary conditions are given, the overall motion process can be calculated using two methods. The first method is based on Stokes flow and solves Laplace's equation $\nabla^2 u(x)=0$. The second method is based on a nonlinear thin viscous sheet model, where the tensile energy density $W_m(x)$ of the thin sheet is:

$$W_m(x)=Yh(x)/(2(1-v^2))((1-v)tr(\epsilon^2)+vtr(\epsilon^2))$$

where h(x) is the thickness of the thin sheet at point x, tr is trace of a tensor, Y is Young's modulus, and v is Poisson's ratio. For an incompressible fluid, $v=0.5$, $Y=3\mu$, and the value for $\mu$ is determined through experiments. $\epsilon$ is the two-dimensional deformation rate of the thin sheet. According to the above energy density equation, the deformation force $f_{int}(x)$ within the thin sheet is:

$$f_{int}(x)=\nabla_x(\int W_m(x)dS)$$

The thickness of the PVA film is under the effect of the color in that, the film grows thicker, and hence less stretchable, as more ink is sprayed onto the film. The film thickness is calculated in two steps as the following. At the first step, the film thickness is assumed to be uniform, and motion of the film is calculated according to Stokes flow to obtain the pattern to be printed. At the second step, calculate a film thickness h(x) at each pixel based on the color of that pixel obtained at the first step, and recalculate motion of the film using the nonlinear thin viscous sheet model. The thickness of each pixel is calculated by converting the color into the CMYK (cyan, magenta, yellow and black) color space and adding together values of the four channels, and the thickness of the ink is proportional to the sum.

Both the Stokes flow and nonlinear thin viscous sheet model are solved using a finite element method (FEM). For each iteration of lowering the object, an intersecting line between the object and the water level is calculated and used as the inner boundary of the film. The outer boundary of the film remains unchanged, and the regions between the inner and outer boundaries are triangulated. All physical parameters of the triangulated mesh are obtained by linear interpolation based on the mesh of the last iteration. Then, boundary velocity condition is established, and an energy equation is solved using implicit method to obtain the velocity of each vertex in the mesh, and move such vertex in the mesh by one increment according to the velocity. Finally, film thickness is updated according to the area change of each triangle, thus completing one iteration. The process is repeated until the object is completely immersed in the water.

3. Calculating texture pattern on the PVA film: calculate a corresponding relationship between each pixel on the PVA film and an object surface point through the virtual simulation, and obtain a texture pattern on the PVA film by assigning a color on the object surface point to the pixel on the PVA film.

One particle is arranged at a midpoint of each pixel on the PVA film, which moves according to the velocity field u(x) of the film during the simulation process. At each step of the simulation, a triangle containing the particle is identified, and the velocity at the point is obtained by interpolating in the triangle. The particle is moved by increments according to the velocity, until the particle is brought into contact with the object surface, and the color of this pixel is taken as the color value of the point on the object surface touched by the particle.

4. Physical printing: the texture pattern obtained through the calculating in the above step is printed onto the PVA film, which is arranged on water surface at a fixed location, for performing water transfer printing.

The texture pattern obtained through the calculating in the above step is printed onto the PVA film using a conventional ink jet printer. After the PVA film is properly fixed by the fixing rods, activator is applied onto the PVA film surface, turning the PVA film into an adhesive thin viscous sheet. Start the linear motor to lower the object at a speed of 5 mm/s, until the object is completely immersed in the water. Take the object out, rinse off the viscous material, and the color is left attached on the object surface.

Figure 4A:
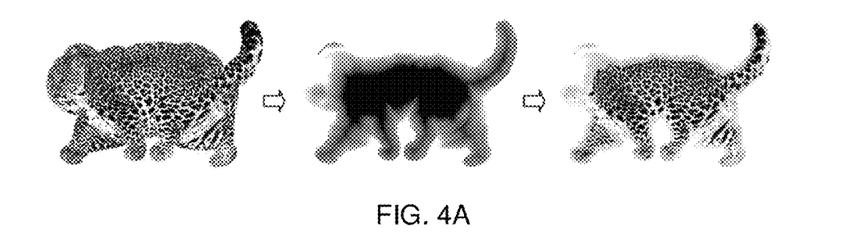
Figure 4B:
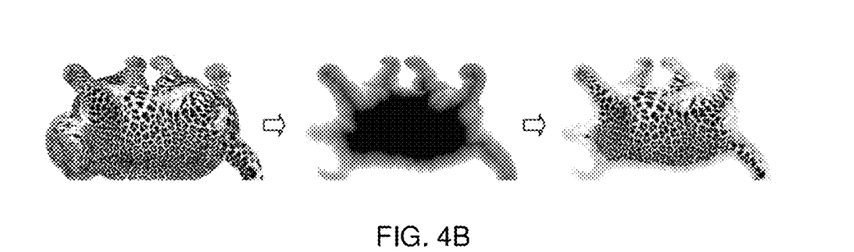
Figure 4C:
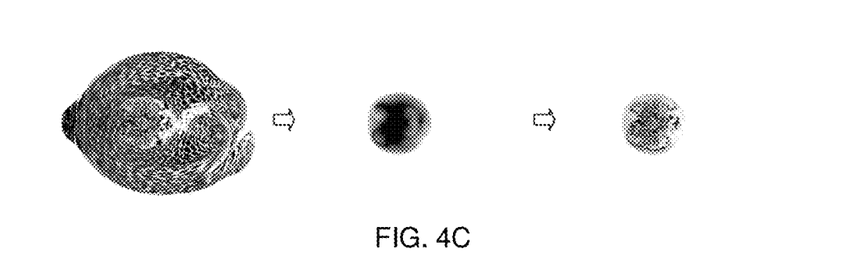

5. Multiple printing: as depicted in FIG. 4A to FIG. 4C, perform water transfer printing operations from varied angles for an object having complex surface geometry, where only a portion of the object surface is colored each time, until the entire object surface is colored. The particular processes are as the following.

5.1 A user specifies a plurality of printing directions, and for each of the directions, mount the object onto the linear motor to obtain the position of the object by scanning. Perform virtual simulation using the Stokes flow to obtain a mapping from the thin sheet pixels to the object surface points for each of the directions separately. For three vertices of each triangle on the object model, locate corresponding points on the thin sheet to obtain a corresponding planar triangle, and the largest singular value of the affine transformation from the planar triangle to the spatial triangle is taken as a measure of the local stretch of the thin sheet. For each vertex on the object model, the direction having the smallest local stretch measure is taken as the primary direction for the purpose of coloring the vertex.

5.2 Calculating a coloring weight for the transitional region. For a transfer printing direction i, a region $\Theta_i$ consists of all vertices that are colored according to the direction is calculated using the stretch measures. For each vertex j within $\Theta_i$, a coloring weight of $\omega_{i,j}=1$ is assigned. For each point j outside of $\Theta_i$, a coloring weight is obtained according to $\omega_{i,j}=1-d_{i,j}/H$, where $d_{i,j}$ is the geodesic distance of vertex j to the nearest boundary of $\Theta_i$, H is width of the transitional region that is typically set at 5 mm, and $\omega_{i,j}=0$ if $d_{i,j}>H$. Then, coloring weights for every direction of every vertex is normalized according to: $\omega_{i,j}=\omega_{i,j}/\Sigma\omega_{i,j}$.

5.3 Again for each printing direction, mount the object onto the linear motor, and obtain the position and orientation of the object by scanning. Perform virtual simulation using the nonlinear thin viscous sheet model to calculate the texture pattern to be printed. In this case, when printing along direction i, the color at vertex j is obtained by interpolation between a color $c_j$, which is directly acquired from the object surface, and a white color according to the calculation: $\omega_{i,j}c_j+(1-\omega_{i,j})W$, where W=(255, 255, 255). This way, the white region for a single printing run will be left colorless, and the overall object will be completely colored after printing for every direction have been accomplished.

A Practical Implementation

An embodiment of this disclosure is implemented on a desktop computer provided with an Intel I5-4430 CPU and a Nvidia GeForce GTX780 display card. In practice, no more than 5 minutes are spent for the calculations of a single virtual simulation run.

Figure 5A:
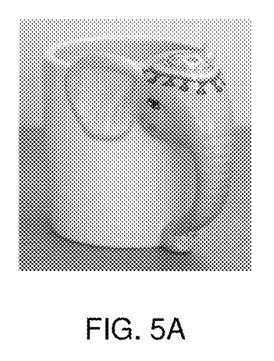
Figure 5B:
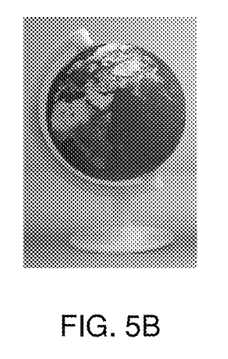
Figure 6:
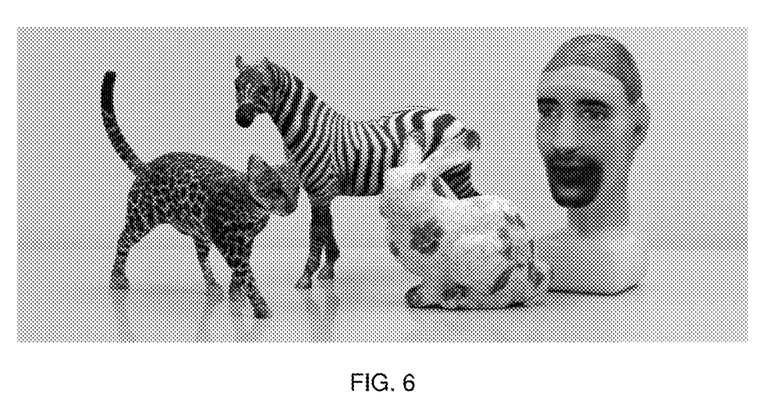
FIG. 6 a perspective view depicting an outcome of a multiple printing according to this disclosure.

Single run colorings are performed for a mug and a globe, as depicted in FIG. 5A and FIG. 5B, while multiple run colorings are performed for a plurality of objects, including statues of a rabbit, zebra, leopard and man head statue, as depicted in FIG. 6. The outcome demonstrates that the present disclosure is capable of precisely coloring an object according to user-specified texture.

What is claimed is:

1. A calculable 3D color printing method, comprising:
   (1) device initialization: fixing an 3D object at an end of a device capable of lifting and lowering at a constant speed; and calculating a position and an orientation of the object relative to a PVA film using a 3D vision system, namely obtaining a 3D model of the 3D object;
   (2) virtual simulation: performing simulated calculation with respect to a motion of the PVA film while the 3D object is being lowered at a constant speed;
   (3) calculating texture pattern on the PVA film: calculating a corresponding relationship between each pixel on the PVA film and an object surface point by the virtual simulation; and obtaining a texture pattern on the PVA film by assigning a color on the object surface point to the pixel on the PVA film;
   (4) physical printing: printing the texture pattern obtained by the calculating at step (3) onto the PVA film; arranging the PVA film onto water surface at a fixed location; and performing water transfer printing and coloring; and
   (5) multiple printing: performing water transfer printing operations from varied angles for an object having complex surface geometry, wherein only a portion of the object surface is colored each time, until the entire object surface is colored.

2. The 3D color printing method according to claim 1, wherein the step (1) comprises sub-steps as the following:
   (1.1) fixing the 3D object at a push rod of a linear motor, wherein the push rod is capable of moving up and/or moving down at a constant speed, a water basin is arranged beneath the motor for arranging the PVA film, and a fixing rod for fixing the PVA film and a marker for 3D positioning are arranged on the water basin;
   (1.2) scanning the 3D object and markers for 3D positioning using a depth camera to obtain a point cloud; and
   (1.3) aligning a digital model of the 3D object and a digital model of the marker to the point cloud employing an iterative closest point (ICP) algorithm, so as to calculate the position and the orientation of the object relative to the PVA film, namely obtaining the 3D model of the 3D object.

3. The 3D color printing method according to claim 1, wherein the step (2) comprises sub-steps as the following:
   (2.1) calculating a waterline of the 3D object according to the position of the 3D object; triangulating a region where the PVA film is presented to obtain a virtual PVA film; initializing a velocity of each vertex on the virtual PVA film to zero; and specifying a boundary condition for the simulated calculation according to a position of the waterline and a surface normal of the 3D model;
   (2.2) solving a motion equation for the virtual PVA film using an implicit method; updating the velocity at each vertex on the virtual PVA film; and then updating a thickness at each vertex on the virtual PVA film;
   (2.3) updating the position of the 3D model according to the speed at which the object is being lowered; updating the waterline of the 3D model; and re-triangulating the region where the PVA film is presented to obtain a new virtual PVA film; and interpolating the velocity and the thickness of each vertex on the virtual PVA film that have been updated at step (2.2); and updating the boundary condition for the simulated calculation; and
   (2.4) iterating through step (2.2) and step (2.3) until the 3D model is completely immersed in the water.

4. The 3D color printing method according to claim 3, wherein the calculating a boundary condition in step (2) comprises sub-steps as the following:
   (a) setting a velocity at zero for each vertex on an outer boundary of the virtual PVA film; and
   (b) setting a velocity at $v_d n(\cos\theta-1)/\sin\theta$ for each vertex on an inner boundary of the virtual PVA film, where $v_d$ is the speed at which the object is being lowered, $\theta$ is an angle between a horizontal plane and a surface tangential direction of the 3D model at a point closest to a virtual PVA film vertex, and n is an unit vector along a horizontal projection of a surface normal direction of the 3D model at a point closest to a virtual PVA film vertex.

5. The 3D color printing method according to claim 1, wherein the step (3) comprises sub-steps as the following:
   (3.1) recording, for each pixel point on the PVA film, a corresponding point where the pixel point is in contact with the 3D model surface; and
   (3.2) setting a color value of each pixel point on the PVA film according to a color value of the corresponding point on the 3D model surface, so as to eventually obtain a texture pattern to be printed onto the PVA film.

6. The 3D color printing method according to claim 1, wherein the step (4) comprises sub-steps as the following:
   (4.1) printing the texture pattern obtained at step (3) onto the PVA film;
   (4.2) placing the PVA film on a water basin, and fixing the PVA film in position with a fixing rod; and
   (4.3) spraying activator onto the PVA film; starting a linear motor to drive the 3D object down at a constant speed, until the texture pattern on the PVA film is attached onto a surface of the 3D object.

7. The 3D color printing method according to claim 1, wherein the step (5) comprises sub-steps as the following:
   (5.1) mounting the object onto a device capable of lifting and lowering according to a plurality of printing directions specified by a user; and calculating, for each of the printing directions, a position and an orientation of the object relative to a PVA film according to step (2);
   (5.2) performing simulated calculation, for each of the printing directions, with respect to a motion of the PVA film in a printing process; and calculating, for each vertex on the 3D model, a corresponding point on the PVA film and a local stretch measure at the vertex of the 3D model;
   (5.3) selecting, for each vertex on the 3D model, a printing direction with the minimum local stretch measure as a primary direction for coloring the vertex, so as to partition the entire 3D model into several regions, wherein each region uses a different printing direction as the primary direction for coloring;
   (5.4) constructing a transitional region on the 3D model where different printing direction regions intersect with one another; and calculating, for each vertex in the transitional region, a coloring weight for each of the printing directions; and
   (5.5) performing, for each of the printing directions, printing operations according to steps (1)-(4), wherein, when step (3) is being carried out, a texture pattern is calculated according to the equation as the following based on the coloring weight obtained at step (5.4):

$$\omega_{i,j} c_j + (1-\omega_{i,j}) W$$

where $\omega_{i,j}$ is the coloring weight, i is a printing direction, j is an index of a vertex, W is white color, and $c_j$ is a color acquired by the vertex j directly from the object surface.

8. The 3D color printing method according to claim 7, wherein the calculating a local stretch measure in step (5.2) comprises sub-steps as the following:

(5.2.1) locating, for three vertices of each triangle on the 3D model, corresponding points on the virtual PVA film to obtain a corresponding planar triangle;

(5.2.2) calculating an affine transformation from each planar triangle to a corresponding spatial triangle, wherein a largest singular value of the affine transformation indicates the local stretch measure for the triangle on the 3D model; and (5.2.3) taking the local stretch measure of each vertex on the 3D model as a largest local stretch measure for neighboring triangles encircling the vertex.

\* \* \* \* \*